(12) United States Patent
Elisea

(10) Patent No.: US 11,484,047 B2
(45) Date of Patent: Nov. 1, 2022

(54) BEVERAGEWARE SEASONING PACKET

(71) Applicant: Daniel Elisea, San Bernardino, CA (US)

(72) Inventor: Daniel Elisea, San Bernardino, CA (US)

( * ) Notice: Subject to any disclaimer, the term of this patent is extended or adjusted under 35 U.S.C. 154(b) by 0 days.

(21) Appl. No.: 17/341,184

(22) Filed: Jun. 7, 2021

(65) Prior Publication Data

US 2021/0378268 A1 Dec. 9, 2021

Related U.S. Application Data

(60) Provisional application No. 63/035,590, filed on Jun. 5, 2020.

(51) Int. Cl.
*B65D 85/72* (2006.01)
*A23L 2/56* (2006.01)

(52) U.S. Cl.
CPC .............. *A23L 2/56* (2013.01); *B65D 85/72* (2013.01)

(58) Field of Classification Search
CPC ............ A23L 2/56; B65D 85/72; A47G 19/22
USPC .............................. 206/77; 401/137, 136, 132
See application file for complete search history.

(56) References Cited

U.S. PATENT DOCUMENTS

| | | | | |
|---|---|---|---|---|
| 3,053,385 A | * | 9/1962 | Spees | A61F 13/00021 206/361 |
| 3,334,790 A | * | 8/1967 | Eaton | B65D 75/38 222/107 |
| 2013/0292414 A1 | * | 11/2013 | Sutherland | A47K 5/1201 222/107 |
| 2018/0273267 A1 | * | 9/2018 | Wilford | B65D 35/14 |

* cited by examiner

*Primary Examiner* — Drew E Becker
*Assistant Examiner* — Chaim A Smith
(74) *Attorney, Agent, or Firm* — Cionca IP Law P.C.; Marin Cionca

(57) ABSTRACT

A seasoning packet having an opening, a pocket made from a first flexible material and being adapted to receive and contain a seasoning, the seasoning pocket being formed by two chambers that communicate with each other via a connecting seasoning pocket portion and further with the opening, two opposed flexible layer extensions made from a second flexible material and extending from an outer edge of the seasoning pocket to the connecting seasoning pocket portion and two opposing rim gaps formed by the flexible layer extensions and a plurality of pocket gap walls and extending from the outer edge of the seasoning pocket to the connecting seasoning pocket portion, the seasoning packet being thus adapted to season a beverageware's or serveware's rim, by allowing folding of the seasoning packet along the two opposing rim gaps and around the rim and squeezing of the seasoning packet while circling the rim.

9 Claims, 8 Drawing Sheets

US 11,484,047 B2

BEVERAGEWARE SEASONING PACKET

CROSS-REFERENCE TO RELATED APPLICATIONS

This application claims the benefit of U.S. Provisional Application No. 63/035,590, filed Jun. 5, 2020, which is hereby incorporated by reference, to the extent that it is not conflicting with the present application.

BACKGROUND OF INVENTION

1. Field of the Invention

The invention relates generally to beverage preparation, and more specifically seasoning beverageware rims.

2. Description of the Related Art

Commonly, serving beverages requires some sort of garnish, while some beverages require seasoning around the rim of the glass they are served in. To accomplish this, most people have to dirty multiple additional dishes to season the rim of their beverages. Alternatively, they try to pour it on the rim, thus making a mess. A majority of people who prepare beverages continuously have to perform the tedious steps of seasoning a cup's rim. The seasoning on a beverageware's rim provides a decorative element to the drink, while also adding more flavor to the beverage.

Typically, when seasoning a beverageware's rim, the person preparing the drink would need to have multiple plates, the seasoning, and the beverageware. They would then need to begin the process of seasoning, which would be multiple steps. The steps usually include wetting the rim either by dipping the beverageware into another plate with a liquid or wetting the rim by hand. The user would usually then pour a significant amount of seasoning onto the plate and dipping each beverageware item into the plate to fully coat the rim. This leads to an excess of product wasted because to fully coat the rim the plate needs a large amount of product. In addition to the wasted seasoning, there is a longer clean-up process because of the extra dishes and the loose seasoning needing to be properly disposed of. These extra steps and the clean-up process cause the typical method for seasoning a rim to be very time consuming.

Another common option people use for a seasoned drink rim is single use pre-seasoned cups. However, this option is not ideal to the user because they cannot use their own drinkware. Furthermore, it is wasteful since after each use the user would need to throw the seasoned cup away.

Therefore, there is a need to solve the problems described above by providing a device for more efficiently seasoning beverageware rims.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description.

In an aspect, a beverageware seasoning packet is provided, the packet having a seasoning opening, a rim gap, and a seasoning pocket. The seasoning opening allows the seasoning to exit the seasoning pocket and be deposited onto a beverage rim. The rim gap allows the beverageware seasoning packet to easily conform the beverage rim's shape. Thus, an advantage is a more efficient and less messy seasoning method for beverage rims.

In another aspect, the beverageware seasoning packet is provided, the packet having perforated edges, which is a space without seasoning product, allows the beverageware seasoning packet to easily glide on a beverage rim. The perforated edges also allow the beverageware seasoning packet to be folded around a beverageware's rim. Thus, an advantage is a contained seasoning and easier application of the seasoning to the beverageware's rim. Furthermore, the packet has the ability to fold. The beverageware seasoning packet folds at the perforated surface, which allows the packet to rest on the rim of a cup. Another advantage is the seasoning being guided by the folded seasoning packet and thus having a more precisely seasoned rim.

In another aspect, a beverageware seasoning packet is provided, along with the shape of two seasoning pockets. The two seasoning pockets allow the product to flow evenly onto a beverageware's rim once pressure is applied. Thus, an advantage is a well-seasoned cup and a more efficient process. Additionally, the beverageware seasoning packet has enough seasoning to coat the entire rim of a beverageware item. Thus, an advantage is only needing one seasoning packet, which means there is not an excess of seasoning wasted.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
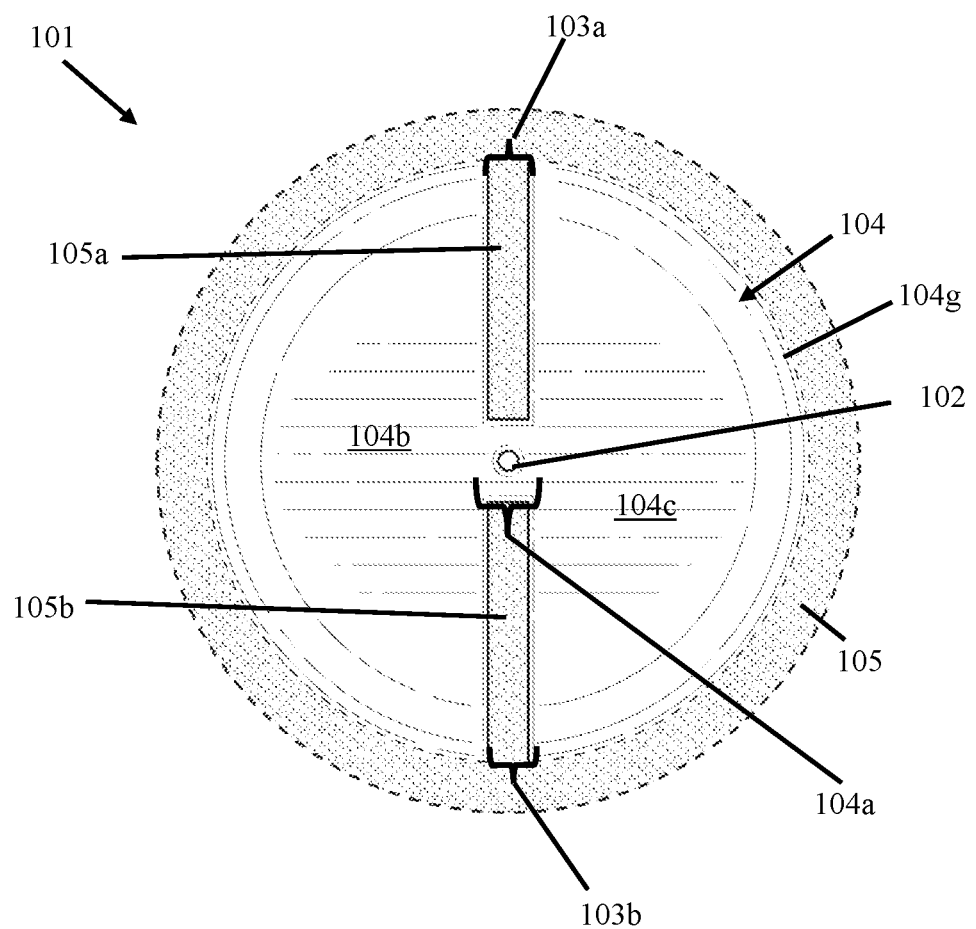
FIG. 1 illustrates the front view of a beverageware seasoning packet, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention.

It should be understood that, for clarity of the drawings and of the specification, some or all details about some structural components or steps that are known in the art are not shown or described if they are not necessary for the invention to be understood by one of ordinary skills in the art.

FIG. 1 illustrates the front view of a beverageware seasoning packet 101, according to an aspect. As shown, in an example, the beverageware seasoning packet ("seasoning packet") 101 may have a seasoning opening 102, rim gaps 103a-b, and a seasoning pocket ("pocket") 104. As it will be described in more detail hereinafter, these elements of the beverageware seasoning packet 101 cooperate to season a beverageware's rim. The beverageware seasoning packet 101, as shown, may be circularly shaped and may have a flexible layer 105 that may have the shape of a ring or rim and that may surround and extend from an outer edge 104g of the seasoning pocket 104. In an example, the flexible layer 105 may be substantially flat and perforated, such as when made from a fabric or woven material. The flexible layer 105 may be absent from some embodiments, but its presence can enhance the structural integrity of the beverageware seasoning packet 101. The seasoning pocket 104 is capable of receiving and seal therein a seasoning. The interior of the seasoning pocket 104 may hold a variety of seasonings or seasoning mixtures. For example, seasoning pocket 104 may also hold a liquid seasoning or flavor.

In an example, the pocket 104 may be filled with seasoning via the opening 102 and then the opening 102 may be sealed with a sticker-like cap (not shown), which can be easily removed by a user before using the seasoning packet 101, as described herein. In another example, the opening 102 may be without a cap, such as when the seasoning is viscous and the opening is small enough (e.g., 0.5 mm) thus preventing the release of the seasoning without an external force (e.g., a squeeze) being applied to the pocket 104.

The pocket 104 may be made of materials that are flexible (e.g., plastic foil, aluminum foil, rubber sheets, etc.) and thus amenable to the squeezing action described hereinafter. The pocket 104 may be made of materials that can sealably contain the particular seasoning within the pocket. For example, for a liquid seasoning, the pocket 104 need to be made from impermeable materials such as plastic foil used to make plastic bags.

As shown in FIG. 1, the pocket 104 may be formed by two chambers 104b-c that communicate with each other via the connecting seasoning pocket portion 104a (204a in FIG. 2) and further with opening 102. The two chambers 104b-c are otherwise sealed, such as, in an example, the only outlet for the seasoning present inside pocket chambers 104b-c is the opening 102.

Figure 7A:
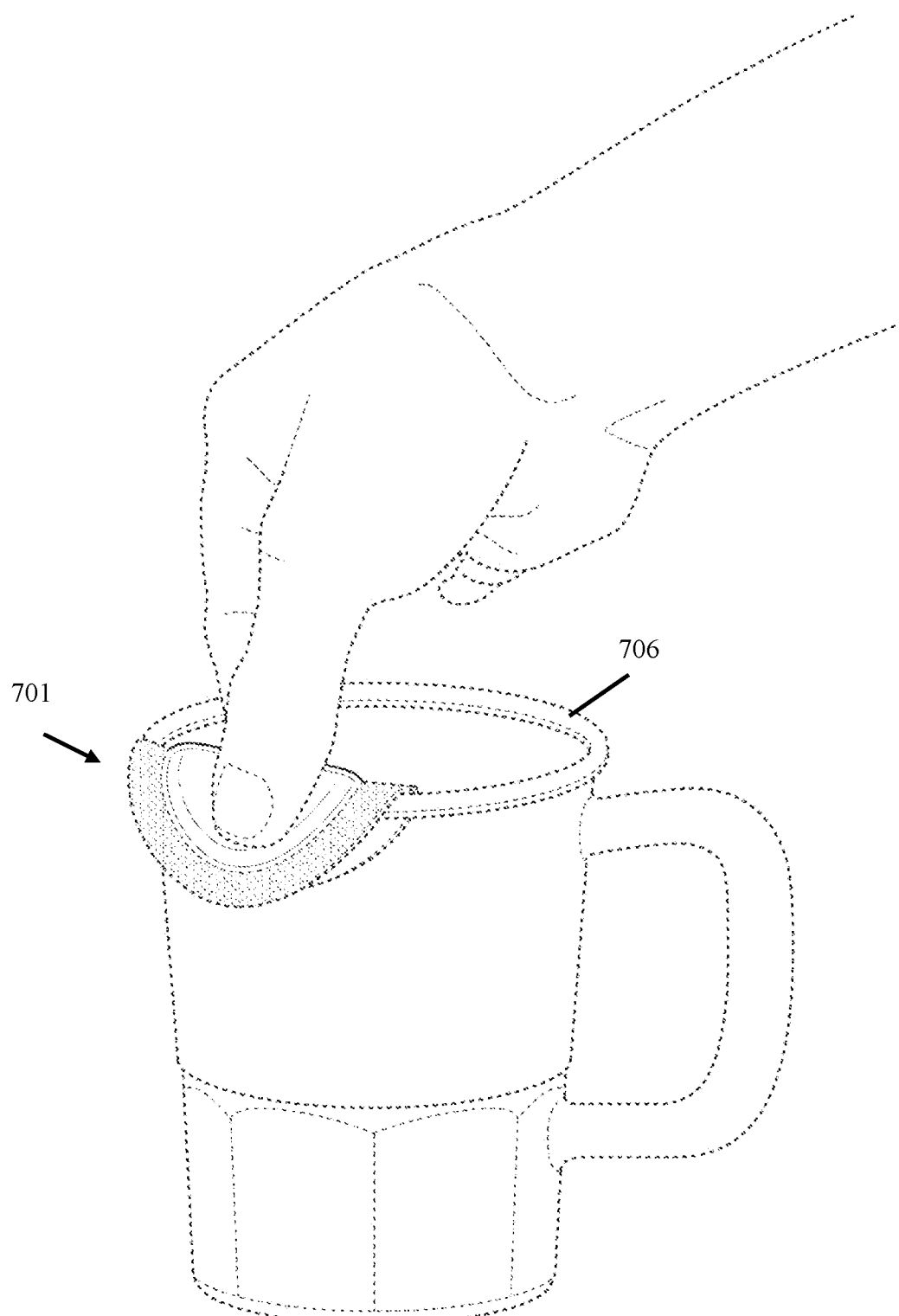
FIG. 7A illustrates the perspective view of a beverageware seasoning packet in use, according to an aspect.
Figure 7B:
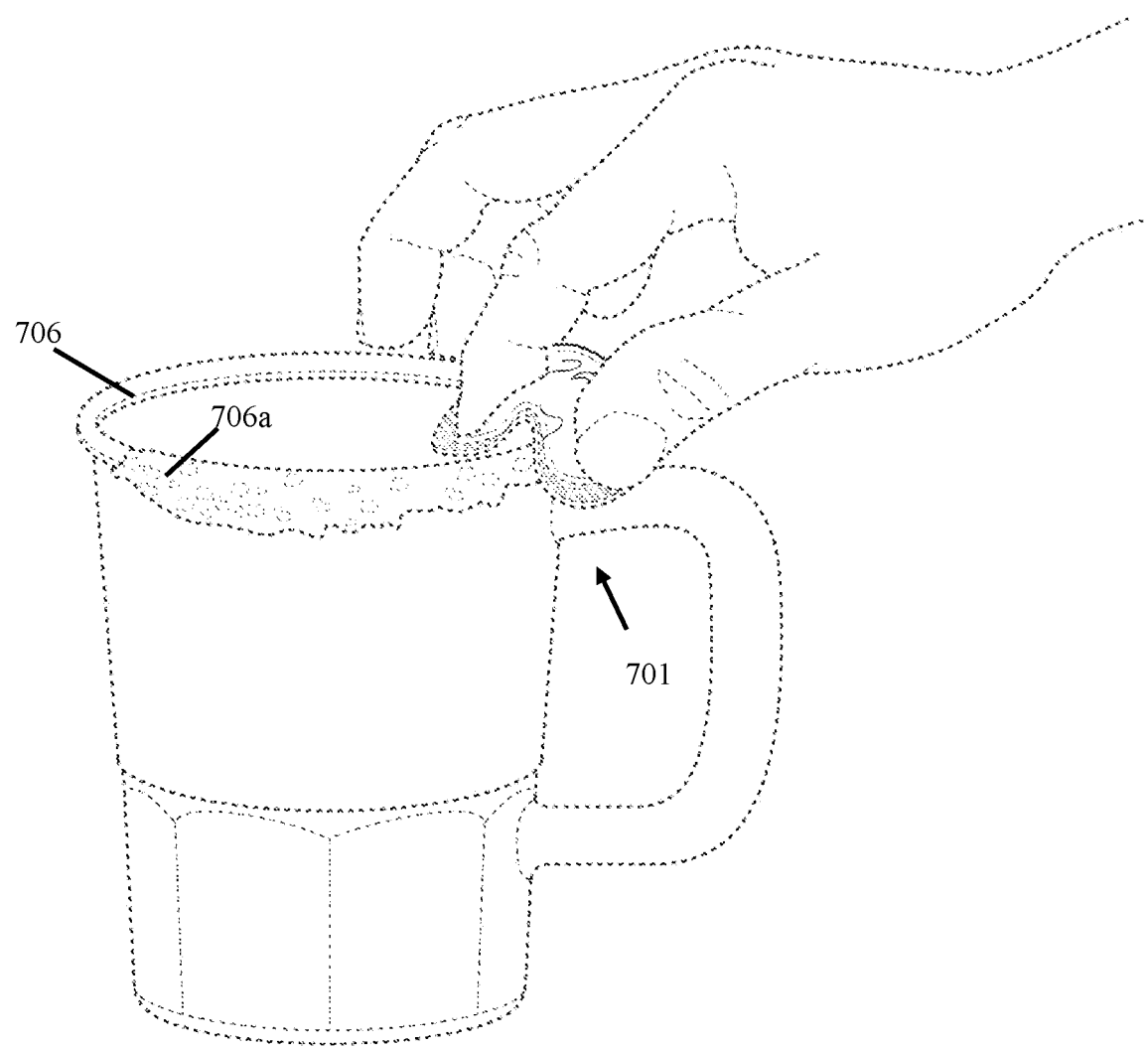
FIG. 7B illustrates the perspective view of a beverageware seasoning packet in use, according to an aspect.

Again, the flexible layer 105 may surround the beverageware seasoning packet 101, as shown in FIG. 1. The flexible layer 105 may also extend radially towards the middle of the packet 101, as shown, via opposed flexible layer extensions 105a-b, such as to form the flexible floor of opposed rim gaps 103a-b, that separate pocket chambers 104b-c. The rim gaps 103a-b allow the beverageware seasoning packet 101 to fold around a beverageware's rim as shown in FIGS. 7A-B, without interfering with the distribution of seasoning. Again, in the center, the seasoning packet 101 may have the seasoning opening 102 to release the seasoning product from chambers 104b-c onto the beverageware's rim. The opposed rims gaps 103a-b also contribute to steering the seasoning toward opening 102 when for example squeezing the pocket 104.

In an example, the beverageware seasoning packet 101 may also be used for other serveware, such as dip bowls or dinner plates for additional seasoning or garnish. In another example, the beverageware seasoning packet 101 may be a single serving packet, which allows the user to add a desired flavor to the rim of any single beverageware or serveware.

Figure 2:
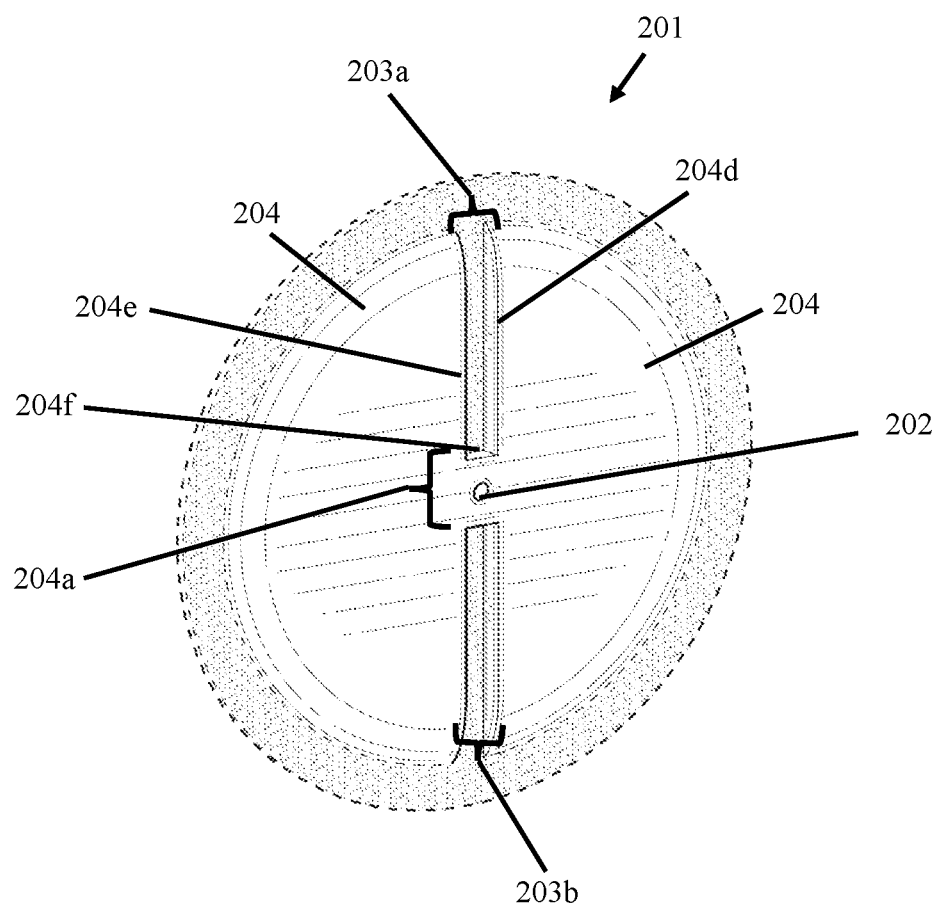
FIG. 2 illustrates the perspective view of a beverageware seasoning packet, according to an aspect.

FIG. 2 illustrates the perspective view of the beverageware seasoning packet from FIG. 1. As shown, the center of the beverageware seasoning packet 201 has the seasoning pocket 204, which may hold any seasoning, seasoning mix, or flavor used for beverages. The seasoning opening 202 may be on the connecting seasoning pocket portion 204a, which may allow the seasoning to easily flow onto the top of a beverageware's rim. The rim gaps 203a-b allow the beverageware seasoning packet 201 to fold around a beverage's rim without interfering with the distribution of seasoning coming out of the seasoning opening 202.

As shown, each of the rim gaps 203a-b may be formed by the corresponding flexible layer extension (105a-b in FIG. 1) and pocket gap walls 204d-f. The rim gaps 203a-b may extend over a substantial length (e.g., 80-90%) of the diameter (or width if rectangularly shaped) of the pocket 204, but not fully, such that to allow the formation of the connecting seasoning pocket portion 204a in the center of pocket 204 and around opening 202.

Figure 3A:
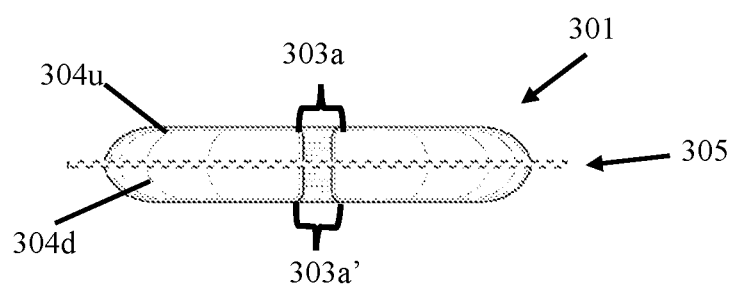
FIG. 3A illustrates the bottom view of a beverageware seasoning packet, according to an aspect.
Figure 3B:
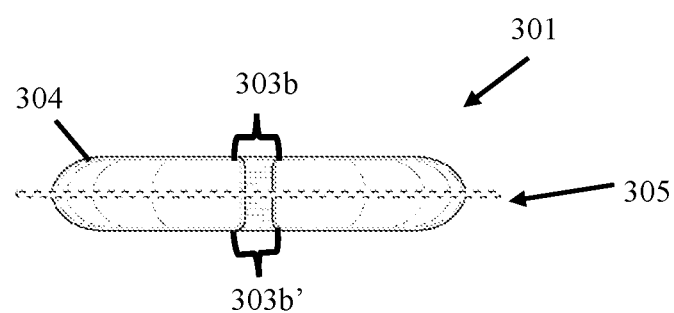
FIG. 3B illustrates the top view of a beverageware seasoning packet, according to an aspect.
Figures 4A, 4B:
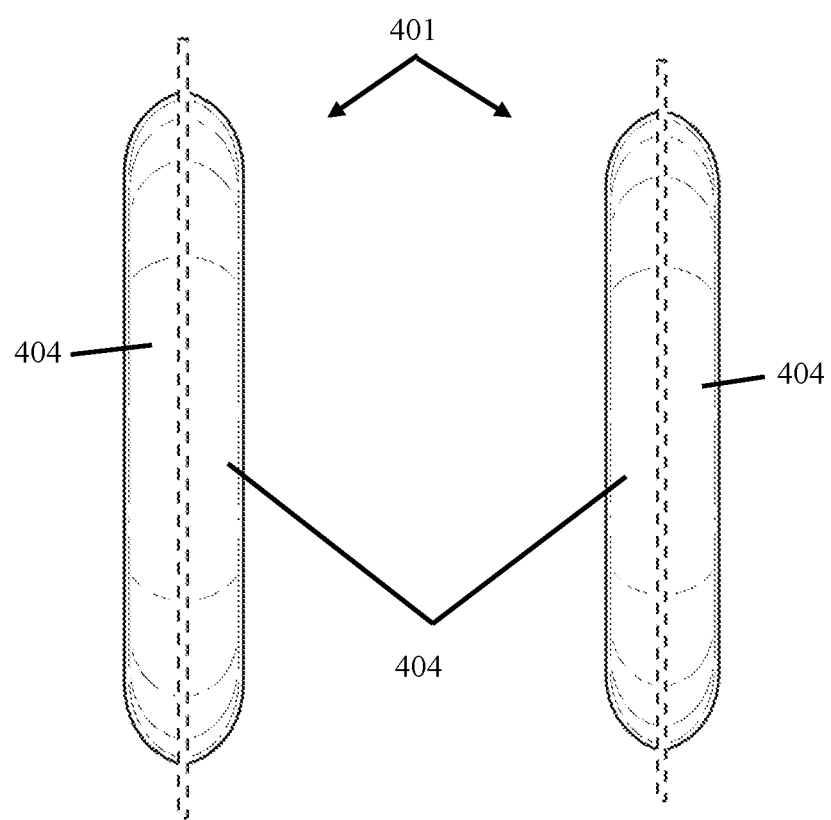
FIG. 4A illustrates the left-side view of a beverageware seasoning packet, according to an aspect.
FIG. 4B illustrates the right-side view of a beverageware seasoning packet, according to an aspect.

FIG. 3A and FIG. 3B illustrate the bottom and top view of the beverageware seasoning packet from FIG. 1, while FIG. 4A and FIG. 4B illustrate the left-side view and right-side view of the beverageware seasoning packet from FIG. 1. The thickness of the beverageware seasoning packet 301, 401 may depend on the amount of seasoning per packet and the type of seasoning. For example, the beverageware seasoning packet 301, 401 may be able to season multiple items of beverageware and thus may have a thicker cross-section (e.g., ½ inch), thus a larger seasoning pocket 304, 404. Furthermore, the thickness of the beverageware seasoning packet 301, 401 may vary on the type of seasoning and on the amount needed to season a single beverageware's rim completely. In another example, the beverageware seasoning packet 301, 401 may be thicker to accommodate more product to allow the beverageware seasoning packet 301, 401 to have enough seasoning to season multiple beverageware rims.

As shown in FIGS. 3A-B, the rim gaps 303a-b (103a-b in FIG. 1) may be disposed within the upper portion 304u of pocket 304 and above the flexible layer 305. In an example, the pocket 304 (404 in FIG. 4) may extend below the flexible layer 305 as well, to form down portion 304d of pocket 304 and a corresponding pair of rim gaps 303a'-b' may be disposed within the down portion 304d, as shown. The upper pair of rim gaps 303a-b may be aligned with the down pair of rim gaps 303a'-b' as shown, to allow for the easy folding of the packet 301 as shown in FIGS. 7A-B. The width of the rim gaps may be for example about ⅛ to ¼ of an inch.

Figure 5:
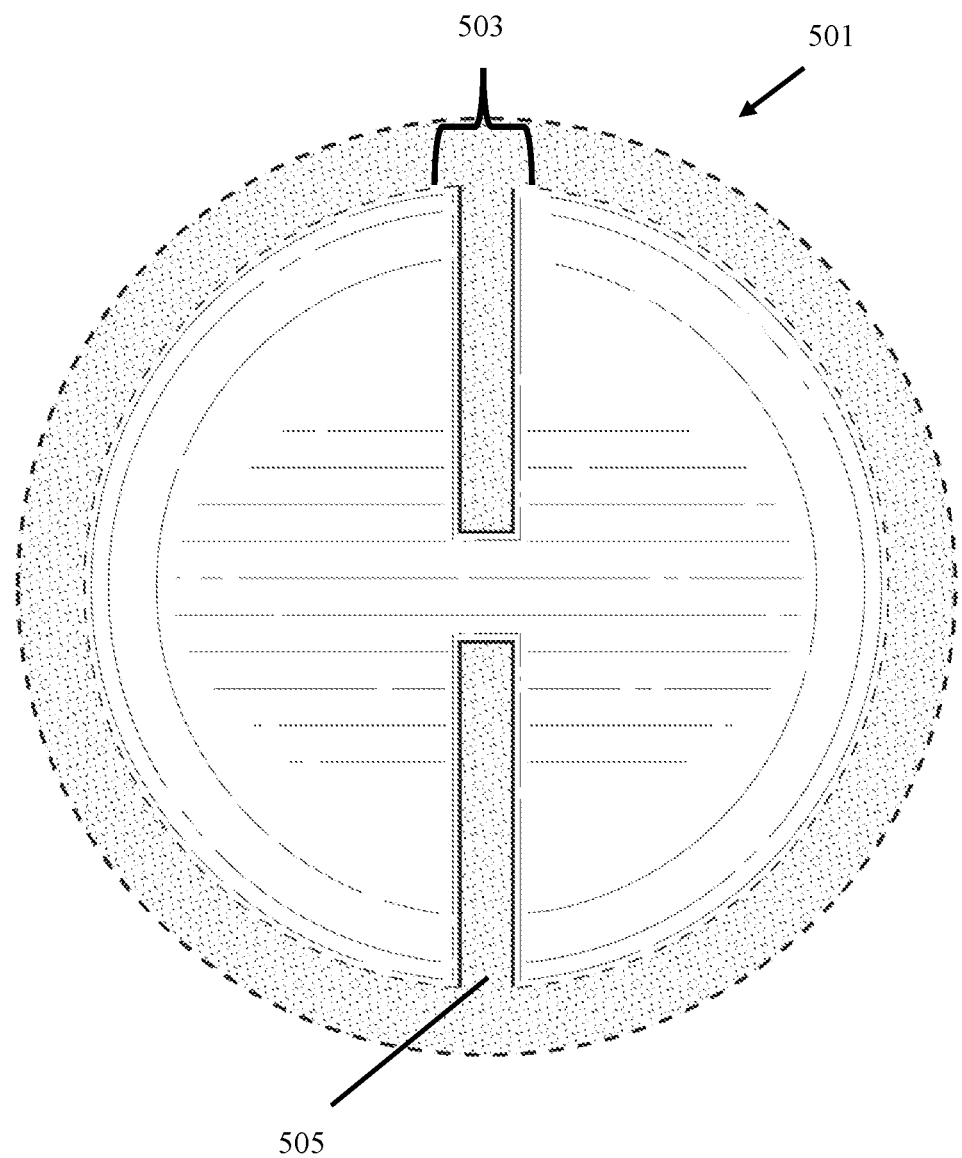
FIG. 5 illustrates the rear view of a beverageware seasoning packet, according to an aspect.

FIG. 5 illustrates the rear view of the beverageware seasoning packet from FIG. 1. As shown, the rear or down side of the beverageware seasoning packet 501 may mirror the layout of the front or upper side, except that there is no opening. This layout may allow for more product to be stored within the seasoning pocket 504, while also having the rim gaps 503 formed, as described above, from the same flexible material as the flexible layer 505, to have the flexibility to be folded around a beverageware's rim.

Figures 6A, 6B, 6C:
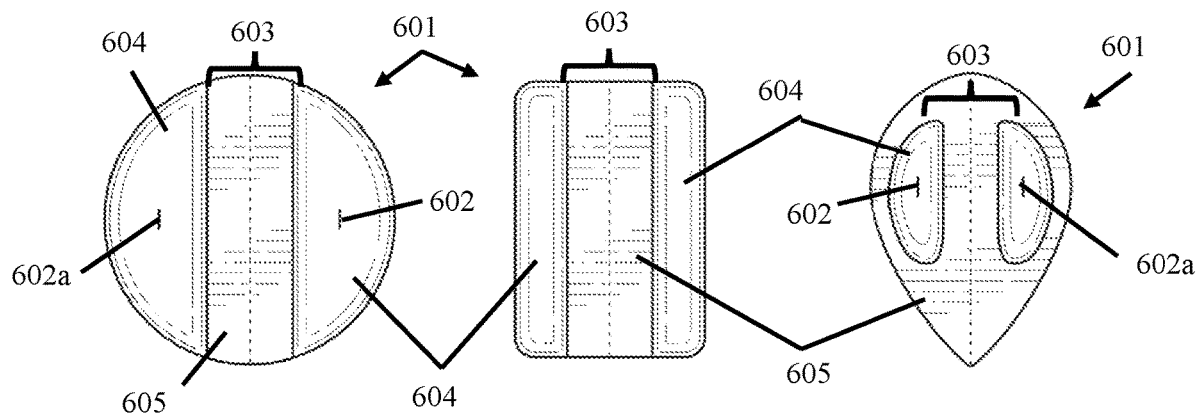
FIG. 6A illustrates the front view of a beverageware seasoning packet, according to an aspect.
FIG. 6B illustrates the front view of a beverageware seasoning packet, according to an aspect.
FIG. 6C illustrates the front view of a beverageware seasoning packet, according to an aspect.
Figure 6D:
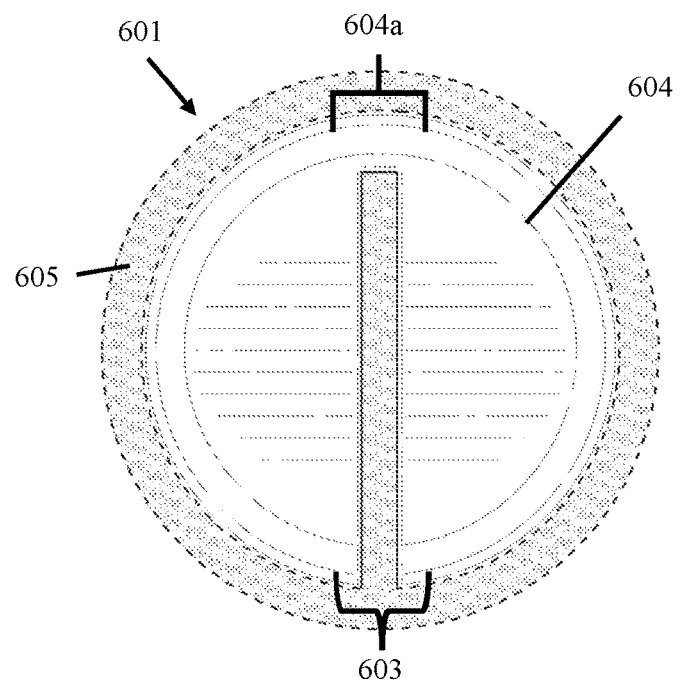
FIG. 6D illustrates the front view of a beverageware seasoning packet, according to an aspect.

The beverageware seasoning packet 601 may also be different shapes as shown in FIGS. 6A-6D. As shown, FIGS. 6A-6D illustrate the front view of a beverageware seasoning packet 601, according to an aspect. FIG. 6A illustrates the front view of a circular beverageware seasoning packet 601 with a sliced opening 602a on each side of the seasoning pocket 604. FIG. 6B illustrates the front view of a rectangular beverageware seasoning packet 601, according to an aspect. FIG. 6C illustrates the front view of a tear drop shaped beverageware seasoning packet 601, according to an aspect. FIG. 6D illustrates the front view of a circular beverageware seasoning packet 601 with a connecting seasoning pocket portion 604a at the top of the seasoning packet 601. Thus, a variety of shapes may be used for the beverageware seasoning packet 601 to easily distribute seasoning onto a beverageware's rim. For example, the seasoning opening 602 may be a sliced opening 602a as shown in FIGS. 6A and 6C. In another example, the seasoning opening 602 may be at the top of the beverageware seasoning packet 601 as shown in FIGS. 6B and 6D.

It should be noted that when the pocket opening is centrally located as shown in FIG. 1 at 102, that may allow the seasoning or a substantial portion of it to be spread onto and remain at the top or the rim of the beverageware, especially when the rim is wider and/or the seasoning is thicker, such that it will not run down the inside or outside the beverageware. On the other hand, as shown in FIG. 6A, when the pocket 604 is split in two separated and non-communicative chambers, by being fully separated by rim gap 603, each chamber may have its own opening, e.g., a sliced opening 602, 602a. This configuration may be more suitable when it is desired to spread the seasoning directly on the outer and inner side of the rim and not on the top of the rim of the beverageware.

As shown in FIG. 7A and FIG. 7B, the perspective view of a beverageware seasoning packet 701 in use, according to an aspect. The beverageware seasoning packet 701 may be folded around a glassware rim 706, as shown in FIG. 7A. Once the beverageware seasoning packet 701 is folded around the glassware rim 706 the user may squeeze the seasoning packet 701 while circling the glassware rim 706. This may allow for an even distribution of seasoning 706a along with a cleaner process. Compared to other procedures for seasoning a beverage's rim, this does not require multiple dishes and the waste of excess seasoning.

For example, the beverageware seasoning packet 701 may be used by opening the seasoning pocket and grabbing the packet with your index finger and thumb, while placing it on the rim of a cup, as shown in FIGS. 7A and 7B. Then, the user would apply pressure as they are moving the beverageware seasoning packet 701 along the rim 706 of the cup.

It may be advantageous to set forth definitions of certain words and phrases used in this patent document. The term "couple" and its derivatives refer to any direct or indirect communication between two or more elements, whether or not those elements are in physical contact with one another.

The term "or" is inclusive, meaning and/or. As used in this application, "and/or" means that the listed items are alternatives, but the alternatives also include any combination of the listed items.

The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. The terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases.

Throughout this description, the aspects, embodiments or examples shown should be considered as exemplars, rather than limitations on the apparatus or procedures disclosed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples.

What is claimed is:

1. A seasoning packet comprising:
   a seasoning pocket having an upper side and a lower side, the seasoning pocket being made from a first flexible material and being adapted to receive and contain a seasoning, the seasoning pocket being formed by two chambers that always communicate with each other via a connecting seasoning pocket portion; a flexible layer made of a second flexible material and surrounding and extending from an outer edge of the seasoning pocket;
   a first pair of opposing flexible layer extensions that extend from the flexible layer that surrounds the seasoning pocket to the connecting seasoning pocket portion;
   a first pair of opposing rim gaps formed within the upper side of the seasoning pocket by the flexible layer extensions and a plurality of pocket gap walls, each of the rim gaps extending from the flexible layer that surrounds the seasoning pocket to the connecting seasoning pocket portion, thus separating the two chambers of the seasoning pocket from each other in both folded and unfolded configurations, the plurality of pocket gap walls comprising two opposing pairs of parallel side walls, each pair of parallel side walls being separated by a distance that defines the width of each rim gap and thus the width of the connecting seasoning pocket portion; and an opening disposed within the connecting seasoning pocket portion;

the seasoning packet being thus adapted to season a beverageware's or serveware's rim, by folding along the first pair of opposing rim gaps to conform to the shape of the beverageware's or serveware's rim without interfering with the release of seasoning through the opening.

2. The seasoning packet of claim 1, wherein the seasoning pocket extends above and below the flexible layer and wherein the seasoning packet further comprises a second pair of opposing rim gaps formed within the lower side of the seasoning pocket, the first and second pairs of opposing rim gaps being superimposed to allow for the folding of the seasoning packet along said first and second pair of opposing rim gaps, wherein each pair of parallel side walls is divided by a corresponding flexible layer extension to form one rim gap of the first pair of opposing rim gaps and one rim gap of the second pair of opposing rim gaps.

3. The seasoning packet of claim 1, wherein the seasoning packet is circularly shaped.

4. The seasoning packet of claim 1, wherein the flexible layer is substantially flat and perforated.

5. The seasoning packet of claim 1, wherein the connecting seasoning pocket portion and the opening are centrally located within the seasoning packet.

6. The seasoning packet of claim 1, wherein the first flexible material and the second flexible material are the same.

7. A seasoning packet comprising:

a seasoning pocket made from a first flexible material and being adapted to receive and contain a seasoning, the seasoning pocket being formed by two chambers that always communicate with each other via a connecting seasoning pocket portion;

two opposed flexible layer extensions made from a second flexible material and extending from an outer edge of the seasoning pocket to the connecting seasoning pocket portion;

two opposing rim gaps formed by the flexible layer extensions and a plurality of pocket gap walls and extending from the outer edge of the seasoning pocket to the connecting seasoning pocket portion, thus separating the two chambers of the seasoning pocket from each other in both folded and unfolded configurations, the plurality of pocket gap walls comprising two opposing pairs of parallel side walls, each pair of parallel side walls being separated by a distance that defines the width of each rim gap and thus the width of the connecting seasoning pocket portion; and an opening disposed within the connecting seasoning pocket portion;

the seasoning packet being thus adapted to season a beverageware's or serveware's rim, by folding along the two opposing rim gaps to conform to the shape of the beverageware's or serveware's rim without interfering with the release of seasoning through the opening.

8. The seasoning packet of claim 7, wherein the first flexible material and the second flexible material are the same.

9. The seasoning packet of claim 7, wherein the connecting seasoning pocket portion and the opening are centrally located within the seasoning packet.

* * * * *